United States Patent [19]

Seymour

[11] 4,162,135
[45] Jul. 24, 1979

[54] QUARTER BALE TURNING APPARATUS

[75] Inventor: Shaun A. Seymour, New Holland, Pa.

[73] Assignee: Sperry Rand Corporation, New Holland, Pa.

[21] Appl. No.: 856,441

[22] Filed: Dec. 1, 1977

[51] Int. Cl.² .............................................. B65G 7/00
[52] U.S. Cl. .................................. 414/780; 100/188 R
[58] Field of Search ............... 214/1 R, 1 QB, 1 HH, 214/6 B, 350, 351, 1 Q; 193/5; 198/416; 100/188 R; 56/473.5, 474, 476, 477

[56] References Cited

U.S. PATENT DOCUMENTS

| 2,529,842 | 11/1950 | Jones et al. | 100/188 R X |
| 2,724,476 | 11/1955 | Steptoe | 56/473.5 X |
| 3,292,766 | 12/1966 | Leibelt | 198/416 X |
| 3,420,354 | 1/1969 | Gardiner | 198/416 |
| 3,472,398 | 10/1969 | Smith | 214/1 QB |
| 3,948,399 | 4/1976 | Michaels | 214/1 Q |

FOREIGN PATENT DOCUMENTS 271371  11/1966  Australia .............................. 214/1 QB

*Primary Examiner*—L. J. Paperner
*Attorney, Agent, or Firm*—Ralph D'Alessandro; Frank A. Seemar; John B. Mitchell

[57] ABSTRACT

Apparatus functioning in combination with a crop bale forming machine to receive an ejected bale of crop material moving along a predetermined path of travel from a bale outlet in a crop bale forming machine and, via conveying means, turn it a predetermined angle about a vertical axis from the predetermined path of travel prior to the bale's assuming a position of rest on the ground.

16 Claims, 7 Drawing Figures

QUARTER BALE TURNING APPARATUS

BACKGROUND OF THE INVENTION

This invention relates generally to the handling of crop material packages produced by crop bale forming machines. Specifically, it is concerned with apparatus which work in conjunction with crop bale forming machines to facilitate the handling of large bales of crop material, such as round bales.

Historically, it has been the custom to harvest forage crops by mowing the crops, letting them dry in the field, forming the dried crop material into windrows and passing a hay baling machine over and along those windrows to form the crop material into rectangular bales. Recent practice has shown that the formation of crop materials into large compact rolls, rather than small rectangular bales as was formerly done, permitted the crop material to be deposited in roll form and left in fields for extended periods of time since the rolled material tends to provide a self-shedding protective covering from inclement weather. The ability to leave these rolled bales in fields thus obviated the additional steps of gathering the rectangular bales and transporting them to a storage area protected from the elements.

The increasing popularity of crop roll forming machines has been their use broaden from rolling wintering forage for livestock to rolling high protein crops, such as alfalfa, for dairy livestock. Despite the excellent weathering characteristics of these large crop rolls, it is still necessary, in most instances, to transport these rolls form their field storage locations at least relatively short distances to livestock feeding locations. Since the crop rolls are formed into large round bales normally ranging in weight from approximately 600 to 1500 pounds, in axial length from approximately 4½ to 5½ feet, and in diameter from approximately 4½ to 6 feet, efficient handling methods are essential in order to make the large round bale handling system feasible as a one-man hay harvesting and handling system for large scale farming operations. Since the size of these bales does not permit their being handled by the manual labor of several persons, much less one person, various mechanical means for handling them have been developed.

One method for handling large round bales involves a single bale handling unit, such as a 3-point hitch tractor mounted rear end loader or a tractor mounted front end loader. These single bale handling units have proven adequate for a farmer with a small scale round bale handling operation. However, such units are uneconomical and inefficient for farming operations involving large numbers of round bales which must be removed from the field and transported to relatively distant feed lots or outdoor storage areas, and then further handled at such storage areas to complete the livestock feeding operations.

Another bale handling method, therefore, has evolved utilizing an efficient and economical round bale handler to move a number of crop material packages. The introduction of large round bale handling apparatus, such as the type shown in U.S. Pat. No. 3,966,063, dated June 29, 1976 to Campbell et al, and U.S. Pat. No. 4,019,644, continuation application dated Apr. 26, 1977 to Seymour, have enabled the large round bale method of hay harvesting to develop into a completely automatic, substantially one-man harvesting and handling system. Further improvements in large round bale handlers, as described and illustrated in U.S. Pat. No. 3,951,288 dated Apr. 20, 1976 to Hale et al and U.S. Pat. No. 3,952,895, dated Apr. 27, 1976 to Campbell, have permitted large round bale handling to advance along with the now extensive commercial acceptance of round baling machines.

This increasingly wide spread usage of large round bale handlers has lead to substantially one-man harvesting and handling systems being utilized in varying geographical locations and under diversified farming conditions. Consequently, these geographical and conditional variables have presented new problems in the implementation of the integrated one-man harvesting and round bale handling system. One of these problems manifested itself in farming areas that have crop fields with steep slopes and rolling hills. Round bales ejected from a momentarily halted round baling machine in these areas have the potential to roll down a hillside when the windrows are formed in a pattern that takes them up and down the terrain's gradient. Additionally, fenced crop fields present handling problems since the outside two windrows of cut crop material, once formed into large round bales by the baling machines, are oriented in the wrong direction to permit fast and economical one-man handling by the type of round bale handlers described above.

The foregoing problems are solved in the design of the apparatus comprising the present invention by essentially orienting the completed crop material packages in a direction that enhances their stability and permits their easy retrieval and transport by multiple large round bale handlers.

SUMMARY OF THE INVENTION

It is the principle object of the present invention to provide an improved crop material package handling apparatus that will function cooperatively with bale forming machines to permit easy and time-saving retrieval of the formed crop material packages from fields by automatic, one-person operated retriever systems.

It is another object of the present invention to provide an improved crop material package handling apparatus that functions in cooperation with a momentarily stopped crop roll forming machine to receive the formed crop roll and position it on a sloping field in an orientation that will obviate the potential for any gravity induced motion by such crop rolls.

It is another object of this invention to provide a crop material package handling apparatus that is suitable for use in combination with crop roll forming machines.

These and other objects and advantages are obtained by providing apparatus functioning in combination with a crop bale forming machine to receive an ejected bale of crop material moving along a predetermined path of travel and, via conveying means, turn it a predetermined angle about a vertical axis from the predetermined path of travel prior to the bale's assuming a position of rest on the ground. It should be noted that although the preferred embodiment of the present invention is in combination with a large round bale forming machine, the apparatus is easily adaptable for use with any type baler, regardless of the size or the shape of the bale formed, be it cylindrical or rectangular.

BRIEF DESCRIPTION OF THE DRAWINGS

The advantages of this invention will become apparent upon consideration of the following detailed disclosure of the invention, especially when it is taken in conjunction with the accompanying drawings wherein.

DESCRIPTION OF THE PREFERRED EMBODIMENT

Figure 1:
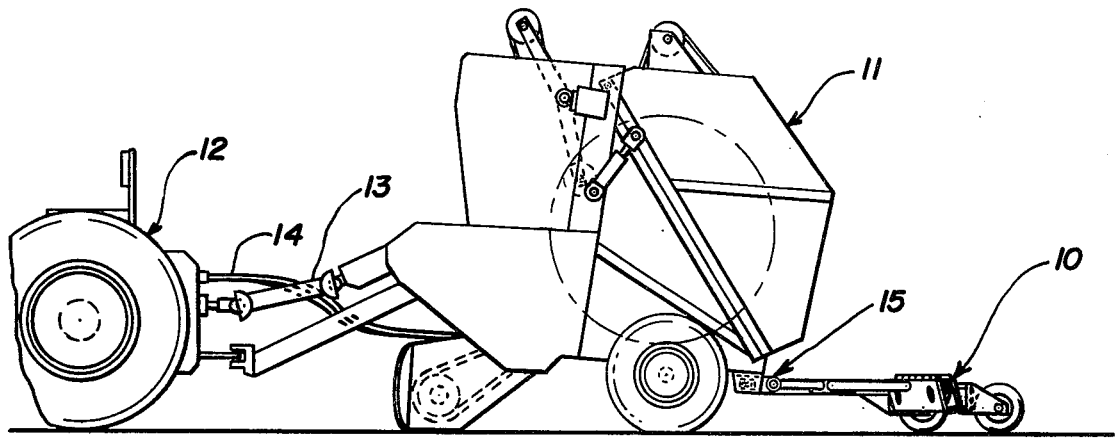
FIG. 1 is a side elevation of a bale turning apparatus attached to a crop roll forming machine illustrating the relative positional relationship between the cooperatively functioning apparatus.

Briefly, FIG. 1 depicts the relative positioning of the bale turning apparatus 10 attached to the crop roll forming machine 11 of the type generally illustrated in U.S. Pat. No. 3,859,909 to Mast, dated Jan. 14, 1975. The crop roll forming machine 11 is in turn attached to a towing vehicle such as the tractor 12 with a power takeoff 13 for providing drive means to the operational components of the crop roll forming machine. The tractor hydraulic lines 14 provide power for the hydraulically operated components of the crop roll forming machine 11 and the bale turning apparatus 10. The bale turning apparatus 10 is attached to the crop roll forming machine 11 by the vertical flotation couplings 15, which allow the bale turning apparatus 10 to be led by the crop roll forming machine 11 and still follow the contour of the ground over which it passes.

Figure 2:
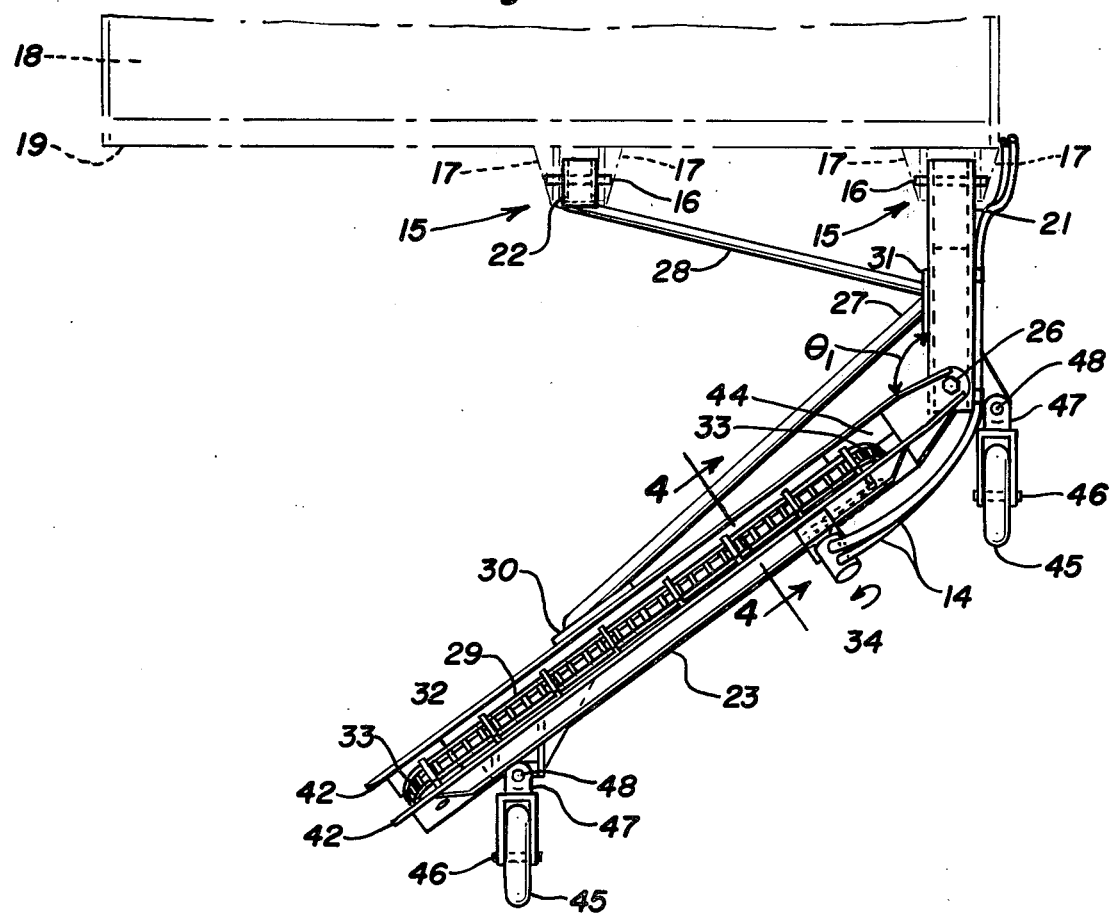
FIG. 2 is a top plan view of the rear of a roll forming machine and a bale turning apparatus.
Figure 3:
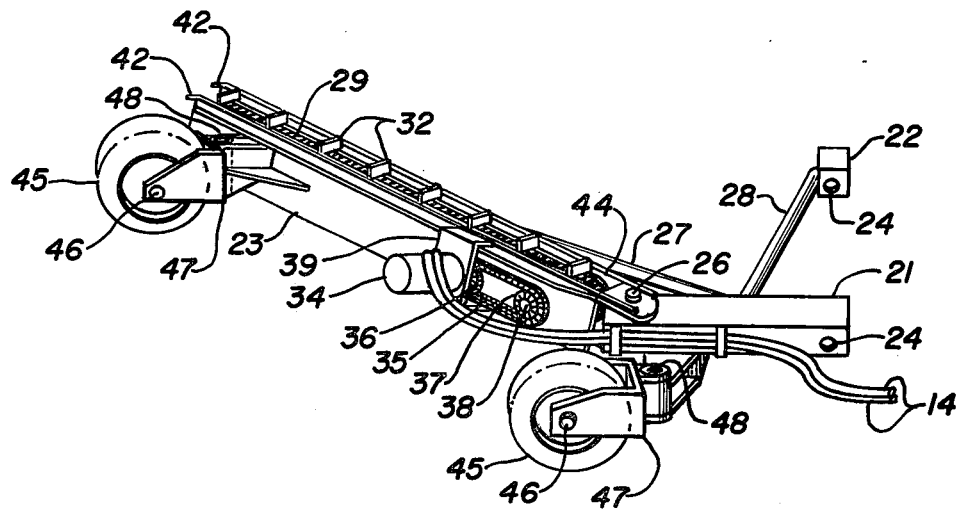
FIG. 3 is a side perspective view of a bale turning apparatus.

FIG. 2 shows the flotation couplings 15 with horizontal tow pintles 16 inserted through the crop roll forming machine's pierced parallel ears 17, which are attached rearwardly and below the floor 18 of the crop roll forming machine 11 to the angled plate 19. The two pintles 16 respectively fit through the pierced coupling member 22 and the pierced longitudinally oriented support member 21 of the bale turning apparatus 10, as shown in FIGS. 2 and 3. The pierced coupling member 22 and the support member 23 have equal diameter drillings 24, shown in FIG. 3, of sufficient size to permit the free rotational movement of bale turning apparatus 10 about the two pintles 16 in response to variations in the ground contour. The tow pintles 16 may be secured within pierced parallel ears 17 by cotter pins or any other suitable means in order to prevent untimely uncouplings of the bale turning apparatus 10 from the roll forming machine 11 during operation.

Figure 4:
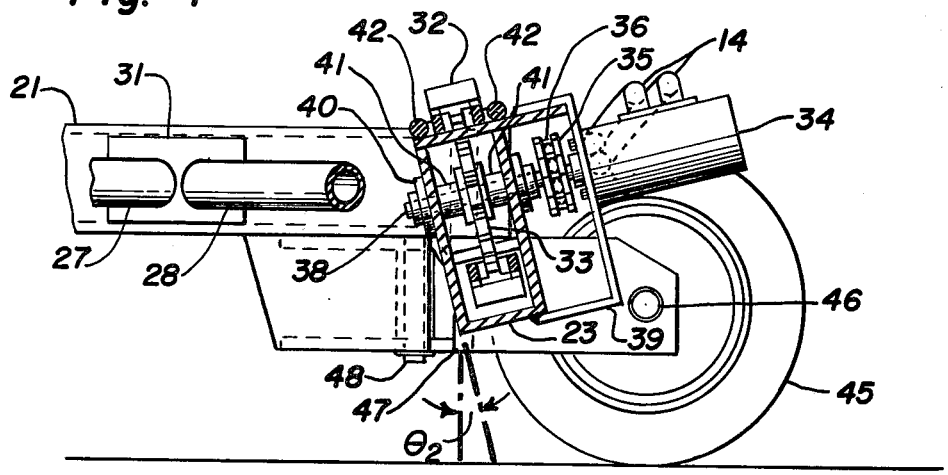
FIG. 4 is a side elevation of a section of the support member that has the conveying chain mounted thereon taken along line 4—4.

As shown in FIG. 2 longitudinal support member 21 is connected to support member 23 at a substantially oblique angle $\theta_1$ by locking pin 26 and welds (not shown), or any other suitable fixed fastening. The angle of $\theta_1$ has been found to be optimally approximately 125 degrees in order to effect the turning of a bale of crop material through approximately 90 degrees. This angular relationship between support members 21 and 23 is reinforced by cross member 27, connecting support member 21 and 23. It is also reinforced by cross member 28 connecting support member 21 with the coupling member 22 that is attached to the vertical flotation coupling 15 of the roll forming machine 11. Cross members 27 and 28 are fastened at their ends to their respective mating surface plates 30 and 31 by welds or some other suitable fastening method. Plates 30 and 31 are fastened respectively to support members 23 and 21 by welding or other suitable fastening methods. Support member 23 further has spanning substantially its entire length at least one endless flexible chain 29 with linearly spaced lugs 32 fastened thereto, as shown in FIGS. 2–4. The flexible chain 29 is mounted about end sprockets 33 which are driven by a power source, such as the hydraulic motor 34. Hydraulic motor 34 is connected through driven sprocket 37 and sprocket shaft 38 to one of the end sprockets 33 by drive chain 35. Hydraulic motor 34 is mounted to support member 23 by motor mounting plate 39 which is secured by either welds or bolts (not shown). The drive chain 35, best shown in FIG. 3, transfers power from the motor sprocket 36 of hydraulic motor 34 to the driven end sprocket 37. There the power is further transferred through the sprocket shaft 38 to one of the end sprockets 33 as shown in FIG. 4. This drive power could be supplied equally well by any other suitable type of power source, such as an electric motor.

End sprockets 33, as best shown in FIG. 4, are held in position by spacer bushings 41 and turned about sprocket shafts 38. Sprocket shafts 38 rotate in bearing bushings 40.

Support member 23, as shown in FIG. 4, is tilted forward at an angle of $\theta_2$ from the vertical. This permits the flexible chain 29 and the lugs 32 to engage the completed crop roll 43 and commence the turning action without having the crop roll 43 carry over the top of support member 23. The angle $\theta_2$ has been found to be most effective for this purpose when established at approximately 14 degrees.

The upper surface of support member 23 has, running parallel to the path of movement of flexible chain 29 and on opposing sides thereof, a pair of guide rods 42 that elevate the crop roll sufficiently to prevent the flexible chain 29 and its lugs 32 from tearing through the crop material package 43 as the chain 29 passes about the sprockets 33. The flexible chain 29 and sprockets 33 are positioned in a channel 44 on the top portion of support member 23 and are equally well adapted for engaging cylindrical or rectangular type bales.

Both support member 21 and support member 23 have fastened to each member a rotatable ground wheel 45 pivotable about the vertical axes of castor pivots 48 so as to permit the bale turning apparatus 10 to follow the movement of the crop roll forming machine 11 across the field without having to be dragged through turns. The ground wheels 45 rotate about lateral wheel shafts 46 and are fixedly fastened in any suitable fashion to support members 21 and 23 by the articulated wheel brackets 47.

Figure 5A:
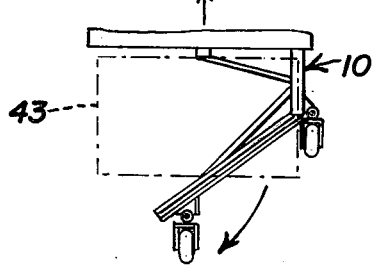
FIGS. 5A, 5B and 5C are top plan views of the quarter turning of a completed crop material package after its ejection from the roll forming machine.
Figure 5B:
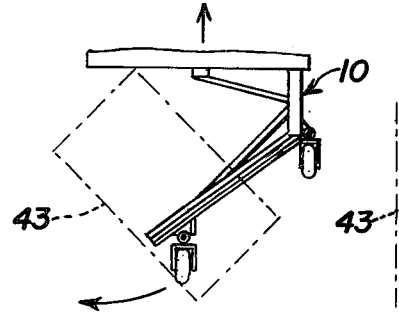
Figure 5C:
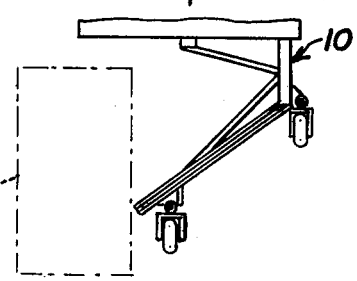

FIGS. 5a, 5b, 5c show in sequence how a crop roll 43, such as a round bale, is ejected from a momentarily halted bale forming machine and is received by the bale turning apparatus 10. The crop roll 43 is then turned through approximately 90 degrees to change from a generally transverse axial orientation with respect to the roll forming machine 11 to a generally longitudinal axial orientation. From these figures it can be seen that the flexible chain 29 and the accompanying lugs 32 engage only one end of the completed crop roll 43 so as to pivot the completed crop roll 43 through approximately 90 degrees about its other end, which is supported by the ground.

While the preferred structure in which the principles of the present invention have been incorporated is shown and described above, it is to be understood that the invention is not to be limited to the particular details thus presented, but, in fact, widely different means may be employed in the practice of the broader aspects of this invention. The scope of dependent claims is intended to encompass all obvious changes in the details, materials and the arrangement of parts which will occur to one of skill in the art upon a reading of this disclosure. Similarly, it is to be understood that the teachings of the invention described above are applicable to other type balers, whether they form round or rectangular bales. Modification may be required, but such should easily be within the skill of the art.

Having thus described the invention, what is claimed is:

1. A bale turning apparatus for use with a bale forming machine having a bale outlet defining a predetermined path of travel along which completed bales move for deposition on the ground, said bale turning apparatus comprising:
   (a) a mobile frame attachable to the bale forming machine,
   (b) support means connected to the frame and extending at least partially across said predetermined path of travel, said support means further having conveying means mounted thereon, said conveying means including bale gripping means movable along at least a portion of the length of said support means; and
   (c) bale-engaging means mounted to at least a portion of said support means and being movable relative thereto across at least a portion of said predetermined path of travel with said bale gripping means for engaging completed bales and turning them a predetermined angle about a vertical axis prior to assuming a position of rest on the ground.

2. The bale turning apparatus according to claim 1 wherein said support means further includes
   a first end and a remote second end, said first end including a coupling means for selective attachment to the bale forming machine such that, in use, said support means extends angularly to and at least partially across said predetermined path of travel.

3. The bale turning apparatus according to claim 2 wherein said support means further includes at least one ground engaging rotatable wheel.

4. The bale turning apparatus according to claim 3 wherein said support means comprises a first portion aligned substantially parallel to said predetermined path of travel and a second portion extending angularly away from said first portion toward said remote second end at an obtuse angle of approximately 125 degrees.

5. The bale turning apparatus according to claim 4 wherein said bale engaging means comprises at least one endless flexible chain mounted on said second portion of said support means.

6. The bale turning apparatus according to claim 5 wherein said bale gripping means further comprises substantially upright lugs fixed to and extending away from said chain at predetermined linear intervals.

7. The bale turning apparatus according to claim 5 wherein said first portion of said support means has extending generally forwardly therefrom a first cross member and generally rearwardly therefrom a second cross member, said first cross member having a coupling for selectively attaching said bale turning apparatus to the bale forming machine, said second cross member rigidly connecting said first cross member and said second portion of said support means in a reinforcing manner.

8. The bale turning apparatus according to claim 6 wherein said flexible chain is driven in a plane through a predetermined path of travel, said plane of said predetermined path of travel being inclined from the vertical at an angle of approximately 14 degrees.

9. The bale turning apparatus according to claim 8 wherein said endless flexible chain is actuated by a drive means.

10. The bale turning apparatus according to claim 9 wherein said drive means for said endless flexible chain comprises a hydraulic motor.

11. The bale turning apparatus according to claim 10 wherein said first portion of said support means has a pivotally movable ground engaging rotatable wheel attached thereto and said second portion of said support means has attached adjacent said remote second end a pivotally movable ground engaging rotatable wheel.

12. A bale forming and handling apparatus comprising:
   (a) a mobile frame supported by ground engaging wheels for movement across a field;
   (b) a bale forming mechanism fixed to and supported by said mobile frame, said bale forming mechanism including a bale outlet defining a predetermined path of travel along which completed bales are ejected from said mechanism for deposition on the ground; and
   (c) a bale turning apparatus selectively affixed to said frame, said bale turning apparatus including support means extending at least partially across said predetermined path of travel and having bale-engaging means mounted to at least a portion thereof movable linearly along at least a portion of the support means; and
   (d) bale gripping means mounted to at least a portion of said support means and movable with said bale-engaging means across at least a portion of said predetermined path of travel for engaging completed bales and turning them a predetermined angle about a vertical axis prior to assuming a position of rest on the ground.

13. The bale turning apparatus according to claim 12 wherein said support means further includes
   a first end and a remote second end, said first end including a coupling means for selective attachment to the bale forming machine such that, in use, said support means extends angularly to and at least partially across said predetermined path of travel.

14. The bale turning apparatus according to claim 13 wherein said support means comprises a first portion aligned substantially parallel to said predetermined path of travel and a second portion extending angularly away from said first portion towards said remote second end at an obtuse angle of approximately 125 degrees, said second portion of said support means further having mounted thereon said bale engaging means having at least one endless flexible chain with said bale gripping means attached thereto, said bale gripping means including substantially upright lugs affixed to and extending and away from said chain at predetermined linear intervals.

15. The bale turning apparatus according to claim 14 wherein said flexible chain is driven in a plane through a predetermined path of travel, said plane of said predetermined path of travel being inclined from the vertical at an angle of approximately 14 degrees.

16. The bale turning apparatus according to claim 15 wherein said first portion of said support means has a pivotally movable ground engaging rotatable wheel attached thereto and said second portion of said support means has attached adjacent said remote second end a pivotally movable ground engaging rotatable wheel.

* * * * *